United States Patent
Matsumoto et al.

(10) Patent No.: US 6,522,416 B1
(45) Date of Patent: Feb. 18, 2003

(54) PRINTING APPARATUS AND METHOD CAPABLE OF FLEXIBLY CONTROLLING RESPONSE SIGNAL

(75) Inventors: Masashi Matsumoto, Yokohama (JP); Akira Kuronuma, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/157,934

(22) Filed: Sep. 22, 1998

(30) Foreign Application Priority Data

Sep. 24, 1997 (JP) .............................................. 9-274997
Sep. 25, 1997 (JP) .............................................. 9-276677

(51) Int. Cl.$^7$ ............................................... G06K 15/00
(52) U.S. Cl. ....................................... 358/1.14; 358/1.9
(58) Field of Search ........................ 358/400, 1.9, 1.14, 358/1.15, 403, 435, 436, 438

(56) References Cited

U.S. PATENT DOCUMENTS 5,467,079 A * 11/1995 Hasegawa .............. 340/825.16

* cited by examiner

Primary Examiner—Jerome Grant, II
(74) Attorney, Agent, or Firm—Fitzpatrick, Cella, Harper & Scinto

(57) ABSTRACT

A recording apparatus and a signal control method for the recording apparatus capable of high speed data reception suitable for each host apparatus and an improved throughput. The recording apparatus is provided with an interface control block and a CPU, the former transmitting an ACKX signal representative of a completion of data reception from a host apparatus to the host apparatus, and the latter controlling not to output the ACKX signal if it is judged that the ACKX signal is unnecessary, and to output the ACKX signal with an optimum width if it is judged that the ACKX signal is necessary.

6 Claims, 19 Drawing Sheets

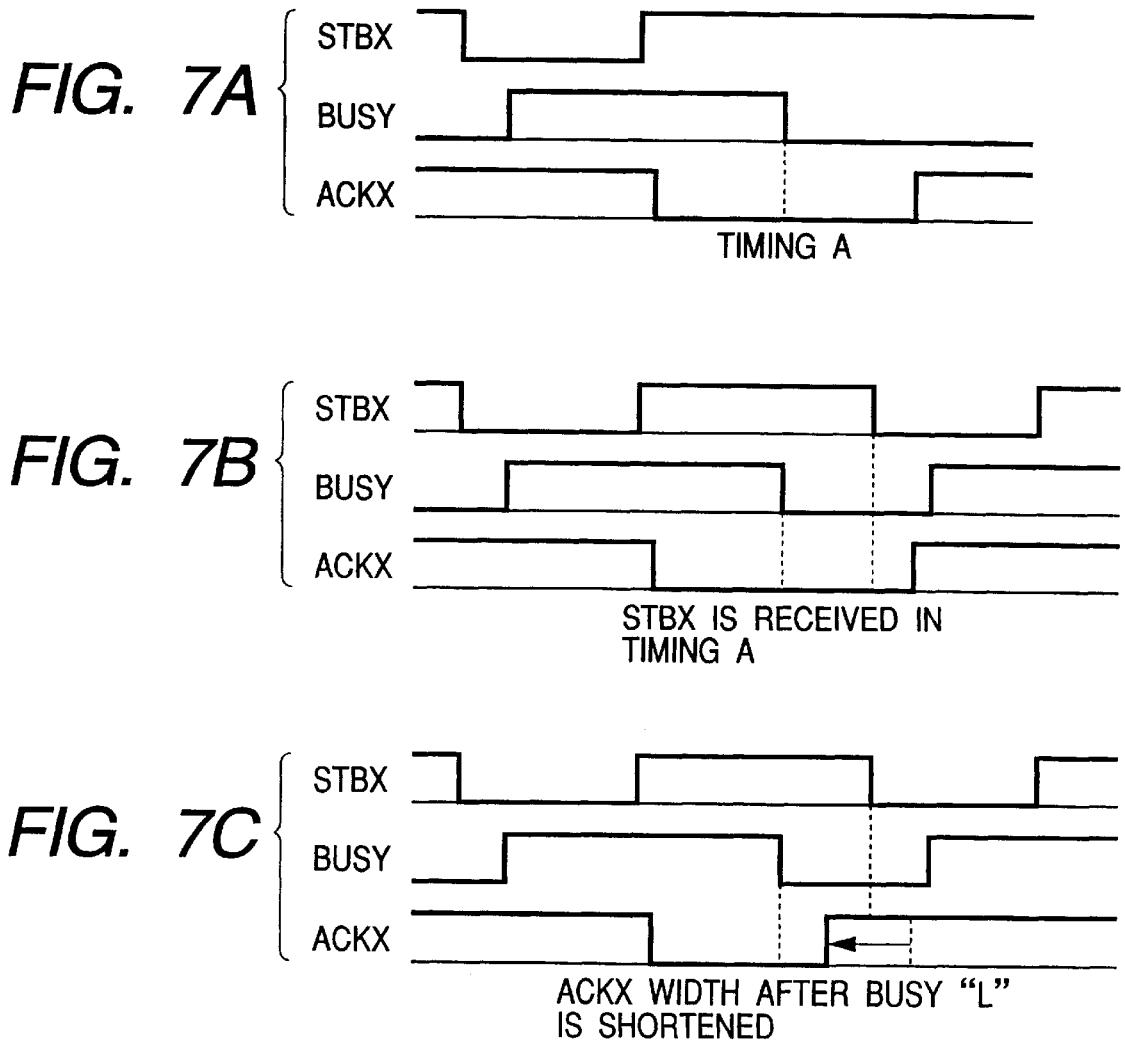

ACKX WIDTH AFTER BUSY "L" IS SHORTENED TO "0"

ACKX WIDTH IN BUSY "H" IS SHORTENED

TIMING A

STBX IS RECEIVED
AFTER ACKX

SHORTEN ACKX WIDTH
IN BUSY "H"

ACKX WIDTH IN BUSY "H" IS SHORTENED TO "0"

ACKX WIDTH AFTER BUSY "L" IS SHORTENED

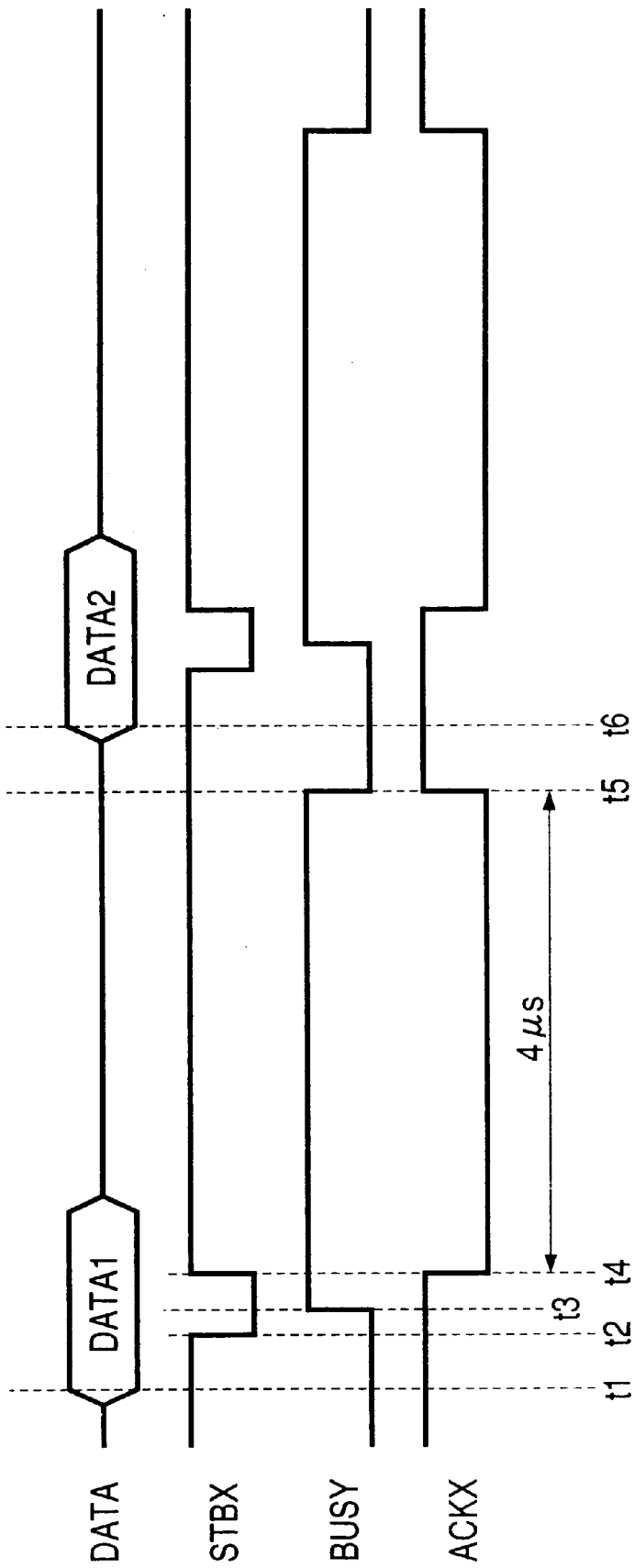

PRINTING APPARATUS AND METHOD CAPABLE OF FLEXIBLY CONTROLLING RESPONSE SIGNAL

BACKGROUND OF THE INVENTION

1. Field of the Invention

The present invention relates to a printer and a printing method in which data is transmitted to and from a host computer through handshaking to print necessary print data, and to a recording medium which stores a program realizing such a printing method.

2. Related Background Art

A printer which uses an interface conforming with Centronics sequentially receives print data (including printer control commands) from a host computer through handshaking and prints it out. With handshaking, print data is received at a timing of an STBX (strobe) signal, and a BUSY (during data reception) or an ACKX (reception completion) is returned back to the host computer to make it stand by or transmits the next print data.

A conventional data transmission speed is as slow as about 20 μsec per one byte as shown in FIG. 18, because of a low data processing ability of a host computer or printer. From this reason, the width of an ACKX signal returned from the printer back to the host computer is set to be about 4 μsec, by taking into account the data transmission speed, a process time required by a noise filter during transmission, and the like.

Some host apparatuses neglect the ACKX signal. Recent host apparatuses in particular have this technical tendency.

As the resolution of a printer is improved nowadays, the print data amount increases so that the data transmission speed is desired to be raised. As CPUs and memories increase their speeds, the data processing ability of a host computer or printer has been improved considerably. Data from a host computer is generally received through DMA. As shown in FIG. 19, it takes therefore only about 300 nsec to return a BUSY signal at a timing t3 after an STBX signal is received at a timing t2 and takes only about 200 nsec to finish data read at a timing t4 after the data read starts at the timing t3. The printer process therefore ends at the timing t4. An increase of the data transmission speed has therefore been suppressed because of a bottle neck of an ACKX signal width of about 4 μsec from the timing t4 to a timing t5.

There is another problem associated with the above-described conventional techniques as in the following. As described earlier, a printer connected via a Centronics interface to a host apparatus is required to output an ACKX signal to the host apparatus regardless of that not all host apparatuses require the ACKX signal. Therefore, the time when the next data can be received becomes unnecessarily long if the host apparatus connected via a Centronics interface to a printer does not require the ACKX signal, resulting in a degraded throughput.

SUMMARY OF THE INVENTION

The present invention has been made under the above-described background art. It is an object of the present invention to increase a data transmission speed from a host computer to a printer as much as possible, depending upon the performance of the host computer and printer.

It is another object of the present invention to provide a printer capable of a high speed data reception and an improved throughput by making the printer acquire information of an ACKX signal necessity of a host apparatus.

In order to solve the above problems, the invention provides a printer which comprises means for transmitting a predetermined response signal when data is received from a higher hierarchical apparatus, and control means for controlling the printer to determine an optimum response time of the predetermined response signal.

BRIEF DESCRIPTION OF THE DRAWINGS

FIGS. 7A, 7B and 7C are timing charts of STBX, BUSY, and ACKX signals of the ink jet printer according to the first embodiment of the invention, FIG. 7A illustrates a timing A, FIG. 7B illustrates a reception of STBX after the timing A, and FIG. 7C illustrates the ACKX width shortened after the period of BUSY "L".

FIG. 8A illustrates the ACKX width made "0" after the period of BUSY "L", and FIG. 8B illustrates the ACKX width shortened during the period of BUSY "H".

FIG. 9A illustrates a timing A, FIG. 9B illustrates a reception of STBX after an output of ACKX, and FIG. 9C illustrates the ACKX width shortened during the period of BUSY "H".

FIG. 10A illustrates the ACKX width made "0" during the period of BUSY "H", and FIG. 10B illustrates the ACKX width made short after the period of BUSY "L".

FIG. 19 is a timing chart illustrating a conventional data transmission control with a host computer and printer having an improved process ability.

DETAILED DESCRIPTION OF THE PREFERRED EMBODIMENTS

Embodiments of the invention will be described with reference to the accompanying drawings.

First Embodiment

Figure 1:
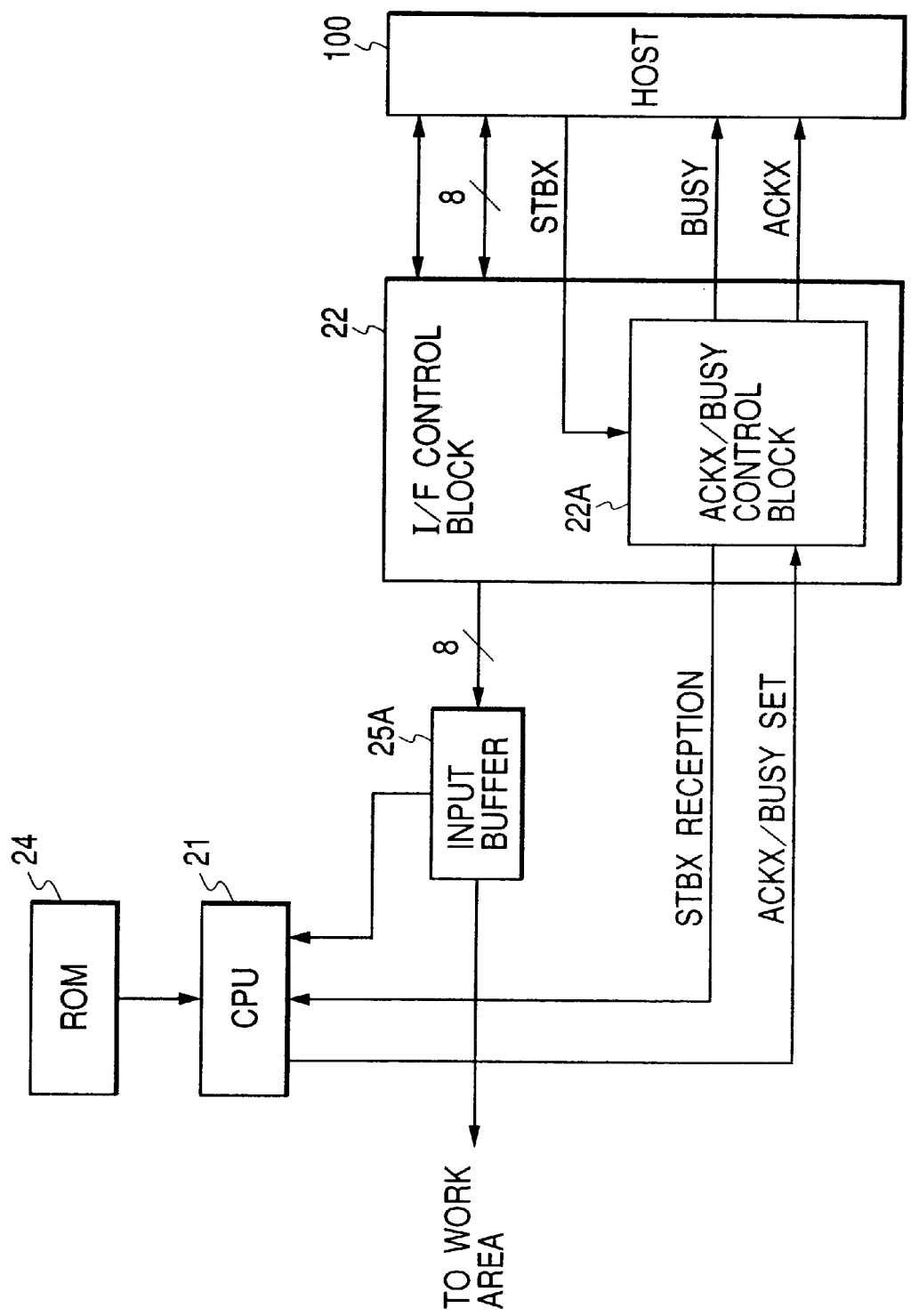
FIG. 1 is a block diagram briefly showing a main part or control system of an ink jet printer and a host apparatus according to first and second embodiments of the invention.

FIG. 1 is a block diagram briefly showing a main part or control system of an ink jet printer and a host apparatus according to an embodiment of the invention. The main part or control system of the ink jet printer is constituted of a CPU 21, an interface (I/F) control block 22, a ROM (program memory) 24, and a reception buffer 25A of a working memory 25 (refer to FIG. 3). The ink jet printer is connected via the I/F control block to the host computer.

The operation of each component of the ink jet printer will be described. CPU 21 controls each component of the ink jet printer in accordance with a program stored in ROM 24. The I/F control block 22 receives data transmitted from the host apparatus 100 and transfers the received data to the reception buffer 25A to be temporarily loaded therein. The I/F control block 22 has an ACKX/BUSY signal control block 22A.

The ACKX/BUSY signal control block 22A receives an STBX signal transmitted from the host apparatus 100 and transmits an ACKX signal (representative of a completion of data reception) and a BUSY signal (representative of an active state of data reception process). The ACKX/BUSY signal control block 22A also receives an ACKX/BUSY setting command from CPU 21 and supplies an STBX reception notice to CPU 21.

The reception buffer 25A separates data transferred from the I/F control block 22 into a command and print data. The command separated by the reception buffer 25A is read by CPU 21, whereas the print data separated by the reception buffer 25A is transferred to another working area 25B (refer to FIG. 3) of the working memory 25.

Figure 2:
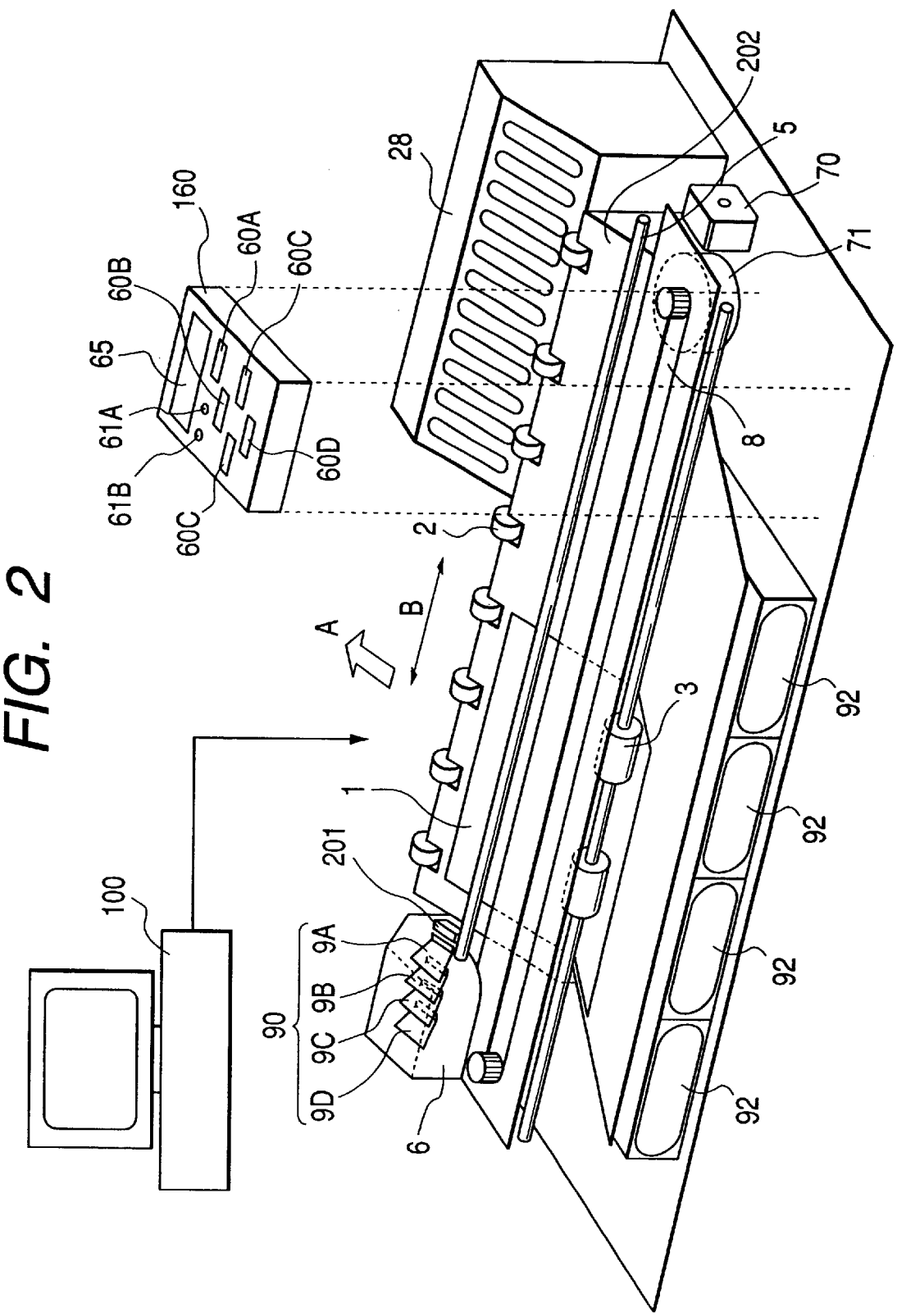
FIG. 2 is a perspective view showing an example of the structure of the color ink jet printer of the first and second embodiments of the invention.

FIG. 2 is a perspective view showing an example of the structure of the color ink jet printer of the first embodiment, the printer being of a so-called thermal jet type having an electric-thermal conversion member serving as jetting energy generating means. The ink jet printer has, in its main frame, transport rollers 2 and 3, a guide shaft 5, a carriage 6, a belt 8, a sheet feed motor 70, a carriage motor 71, a print head unit 90, an ink cartridge 92, an operation panel 160, and the like.

The structure and operation of each component of the ink jet printer will be detailed. A recording medium 1 such as a paper sheet and a plastic sheet loaded in the ink jet printer is supported with a pair of transport rollers 2 and 3 disposed in right and left areas of a recording area, and transported in an arrow A direction by the transport rollers 2 and 3 which are driven by the sheet feed motor 70. The guide shaft 5 is disposed in parallel to and in front of the transport rollers 2 and 3. The carriage 6 is reciprocally moved in an arrow B direction along the guide shaft 5 by the belt 8 which is driven by the carriage motor 71.

The carriage 6 serving as a head moving means has a BJ type ink jet print head unit 90 disposed along the motion direction of the carriage 6 for color image formation. This print head unit 90 has four print heads for cyan (C), magenta (M), yellow (Y), and black (B) colors, including a black print head 9A, a cyan print head 9B, a magenta print head 9C, and a yellow print head 9D.

Each of the print heads 9A to 9D of the print head unit 90 has an ink jet unit formed on the front side thereof, i.e., on the side facing a recording surface of the recording medium 1 spaced by a predetermined distance (e.g., 0.8 mm). The ink jet unit has a plurality of ink jet-out nozzles (e.g., 48 or 64 nozzles) disposed in line in a vertical direction perpendicular to the motion direction of the carriage 6. The print head unit 90 prints data by jetting out ink from the ink jet unit onto the recording medium 1.

The operation panel 160 mounted on an outer case (not shown) of the ink jet printer is provided with a key operation unit and a display unit. The key operation unit includes keys such as an on-line/off-line switching key 60A for switching between an on-line operation and an off-line operation of the ink jet printer, a menu key 60B, a switching key 60C, a select key 60D, and the like. The display unit includes an alarm LED 61A, a power LED 61B, and a display LCD (liquid crystal display) 65.

Figure 3:
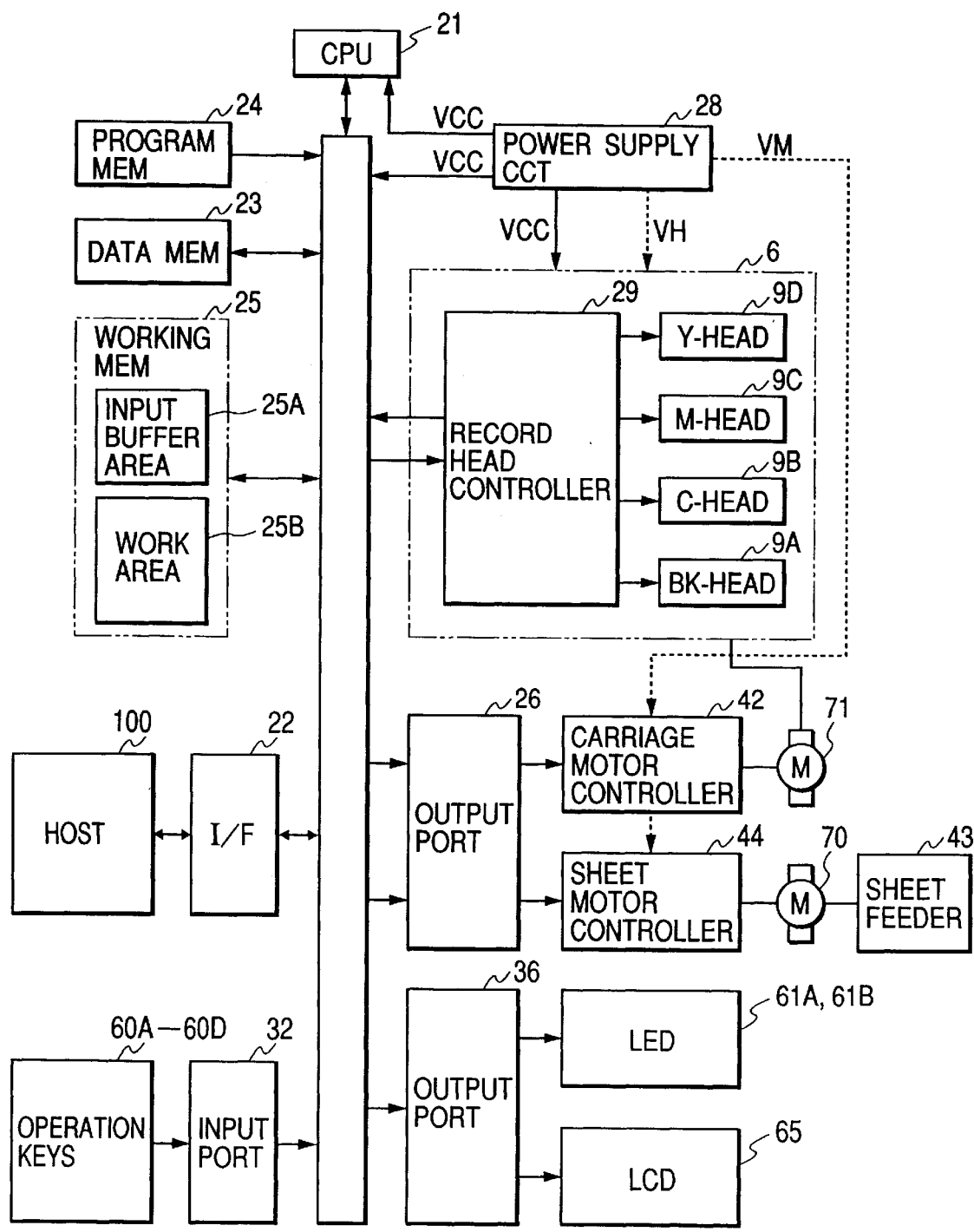
FIG. 3 is a block diagram showing the control system and the structure of each mechanical unit of the ink jet printer of the first and second embodiments of the invention.

FIG. 3 is a block diagram showing the control system and the structure of each mechanical unit of the ink jet printer of the first embodiment. The ink jet printer is constituted of CPU 21, data memory 23, program memory 24, working memory 25, power supply circuit 28, print head control circuit 29, black print head 9A, cyan print head 9B, magenta print head 9C, yellow print head 9D, I/F control block 22, operation keys 60A to 60D, input port 32, output port 26, carriage motor control circuit 42, carriage motor 71, sheet feed motor control circuit 44, sheet feed motor 70, transport mechanism 43, output port 36, alarm LED 61A, power LED 61B, and LCD 65.

The structure of main components described above will be detailed. CPU 21 has a microprocessor and is connected via the interface 22 to the host apparatus 100. CPU 21 controls a print operation in accordance with a command signal and print data stored in the data memory 23 and read by a controller of the host apparatus 100 and in accordance with programs and print instruction data stored in the program memory 24, working memory 25 and the like.

CPU 21 also controls a print operation by controlling the carriage motor 71 and sheet feed motor 70 by using the output port 26, carriage motor control circuit 42 and sheet feed motor control circuit 44, and by controlling the print head 9A to 9D in accordance with print data stored in the data memory 23 by using the print head control circuit 29 mounted on the carriage 6.

The program memory 24 is a ROM and stores programs. The data memory 23 stores a command signal transmitted from the controller of the host apparatus 100. The working memory 25 is a RAM and stores print instruction data. The working memory 25 is constituted of the reception buffer 25A and working area 25B.

Signals entered by the operation keys 60A to 60D are supplied to CPU 21 via the input port 32. CPU 21 supplies control signals via the output port to the alarm LED 61A, power LED 61B, display LCD 65, and the like to perform a display control of the display unit.

The power source circuit 28 supplies a logic drive voltage VCC (e.g., 5 V) for powering a control logic circuit, a motor drive voltage VM (e.g., 30 V) for powering the motors, a reset voltage RESET, a heating voltage VH (e.g., 25 V) for powering the electric-thermal conversion members of the print heads 9A to 9D to heat them.

Figure 4:
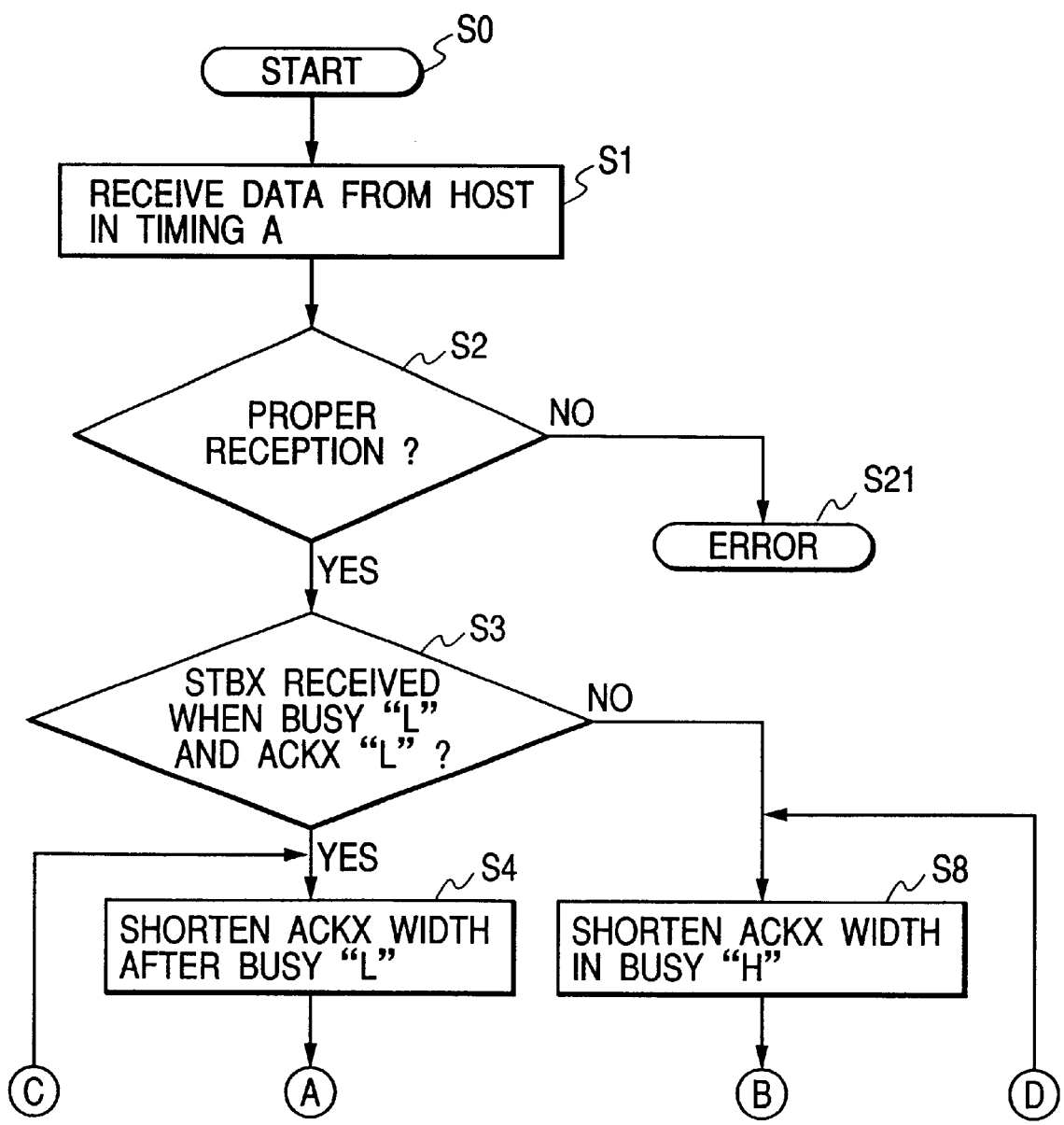
FIG. 4 is a flow chart illustrating the procedure of controlling ACKX and BUSY signals according to the first embodiment of the invention.
Figure 5:
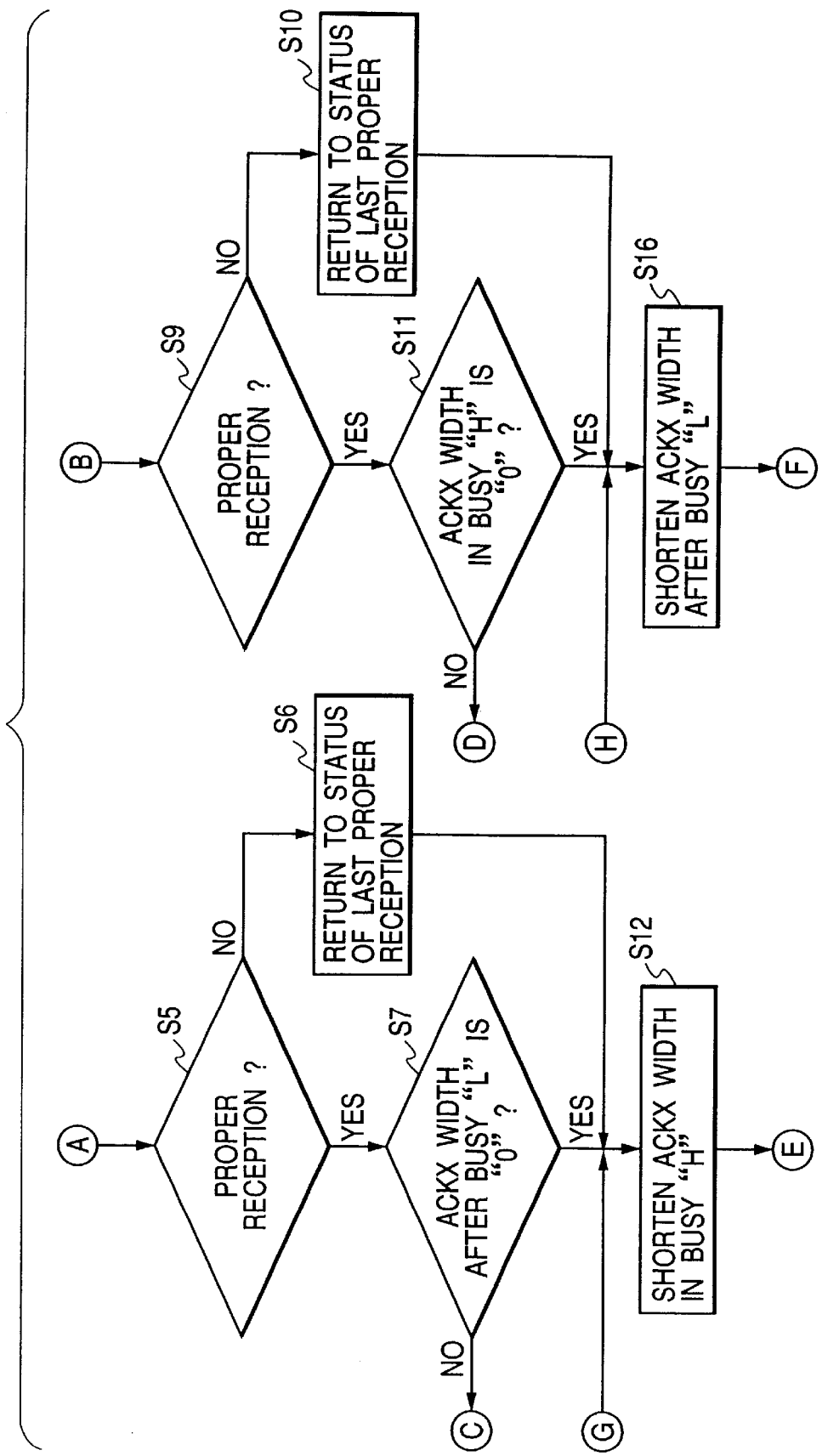
FIG. 5 is a flow chart illustrating the procedure of controlling ACKX and BUSY signals according to the first embodiment of the invention.
Figure 6:
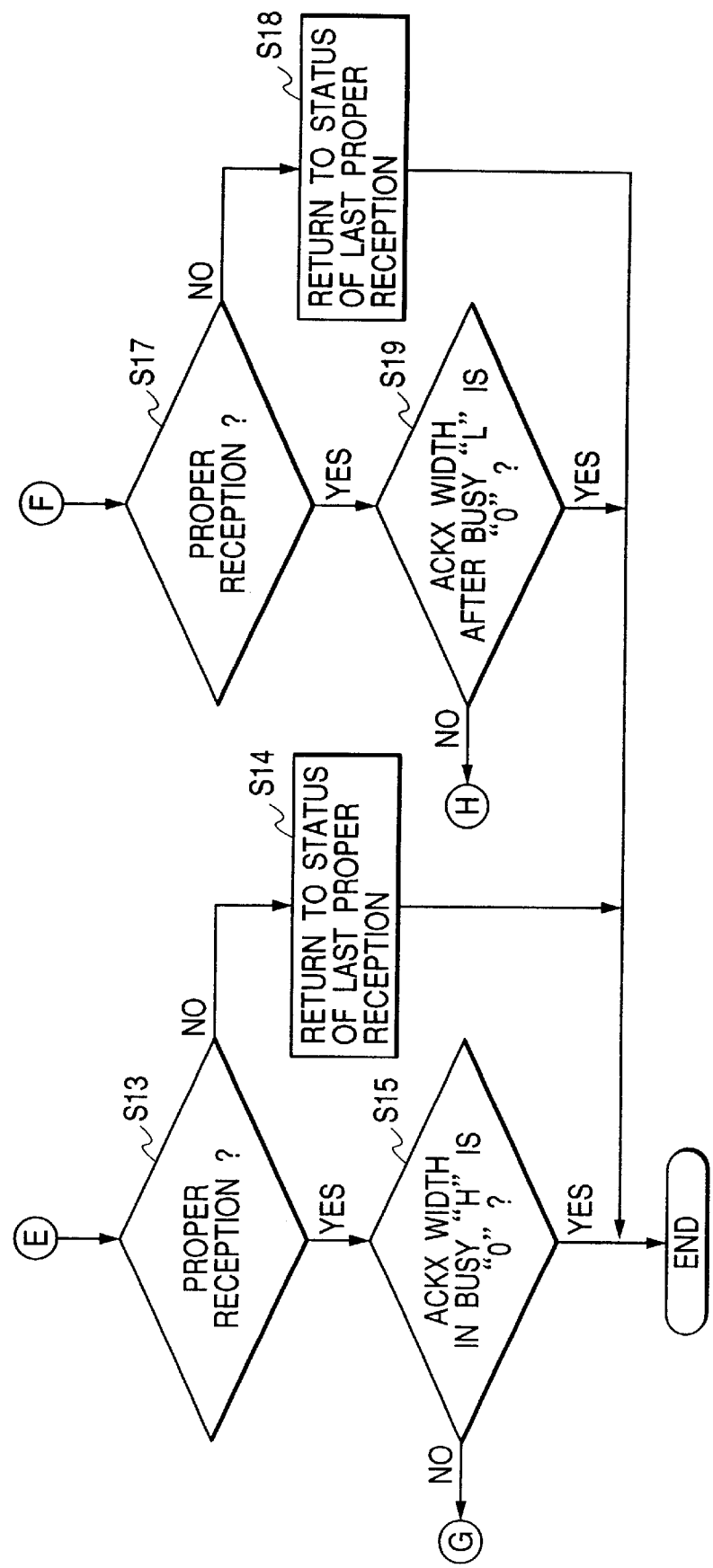
FIG. 6 is a flow chart illustrating the procedure of controlling ACKX and BUSY signals according to the first embodiment of the invention.

Next, with reference to the flow charts of FIGS. 4 to 6 and the timing charts of FIGS. 7A to 10B, a procedure of controlling an ACKX signal and a BUSY signal of the ink jet printer of the first embodiment will be described. FIGS. 4 to 6 are the flow charts illustrating the procedure of controlling the ACKX and BUSY signals, and FIGS. 7A to 10B are the timing charts of STBX, BUSY, and ACKX signals controlled by the procedure. Programs executing the flow charts shown in FIGS. 4 to 6 are stored in ROM 24 and executed by CPU 21.

As the process starts (Step S0), reception of data from the host apparatus 100 is tried a plurality of times in the timing A (refer to FIG. 7A). It is checked whether the data was correctly received (Step S2). If not, it is judged that an error occurred (Step S21), whereas if correctly received, it is checked whether the STBX is received during the period of BUSY "L" and ACKX "L" (Step S3).

The judgement at Step S2 whether the data was correctly received is performed in the following manner. If the ACKX signal is too short as the host apparatus cannot detect it, the host apparatus will not transmit the next data. Therefore, if a predetermined time lapses until the next data is received, then it is possible to judge that the data was not correctly received. Conversely, if the next data can be correctly received in the predetermined time, it is possible to judge that the data was correctly received.

If the STBX signal is received during the period of BUSY "L" and ACKX "L" (Yes at Step S3), then the trailing portion of ACKX is shortened (refer to FIGS. 7B and 7C). The width of ACKX after the period of BUSY "L" is shortened until it eventually becomes 0 (refer to FIG. 8A, Steps S4 to S7).

Figure 8A:
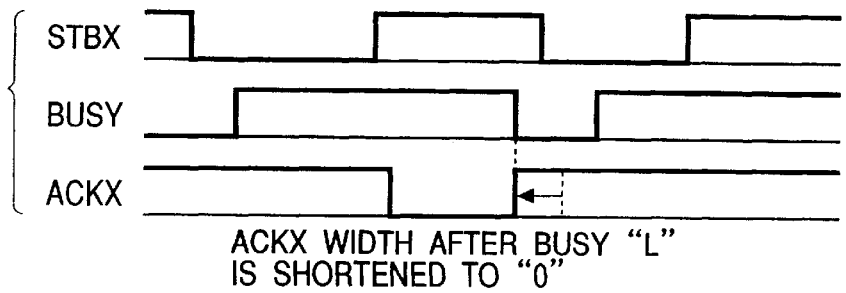
FIGS. 8A and 8B are timing charts of STBX, BUSY, and ACKX signals of the ink jet printer according to the first embodiment of the invention.
Figure 8B:
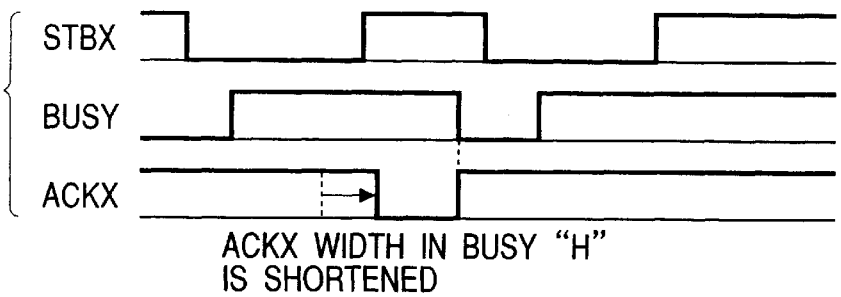

Next, the ACKX "L" time during the period of BUSY "H" is gradually shortened (refer to FIG. 8B, Steps S12 to S15). If data can be received even after ACKX is lost, then ACKX is not output thereafter, whereas if data becomes unable to be received at an intermediate cycle, the timings of ACKX and BUSY are set under the conditions one cycle before to resume data reception.

Figure 9A:
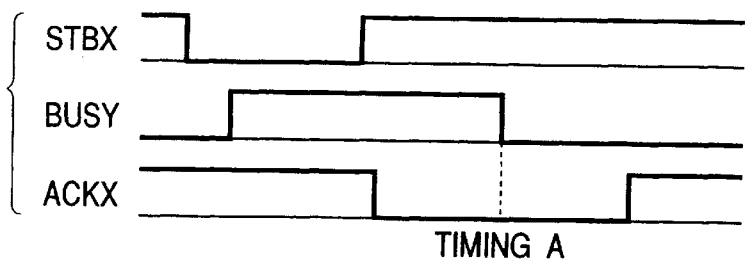
FIGS. 9A, 9B and 9C are timing charts of STBX, BUSY, and ACKX signals of the ink jet printer according to the first embodiment of the invention.
Figure 9B:
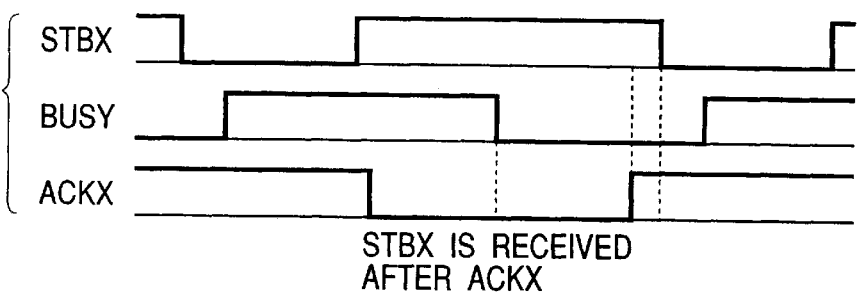
Figure 9C:
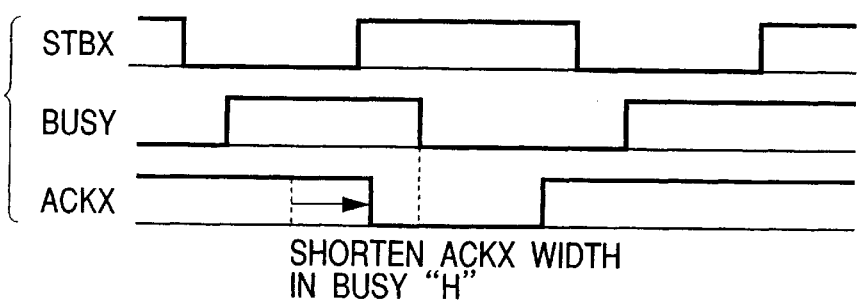

On the other hand, if STBX cannot be received during the period of BUSY "L" and ACKX "L" in the timing A (refer to FIG. 9A) at Step S1 (No at Step S3), then the leading portion of ACKX is shortened (refer to FIGS. 9B and 9C). The width of ACKX during the period of BUSY "H" is shortened until it eventually becomes 0 (refer to FIG. 10A, Steps S8 to S11).

Figure 10A:
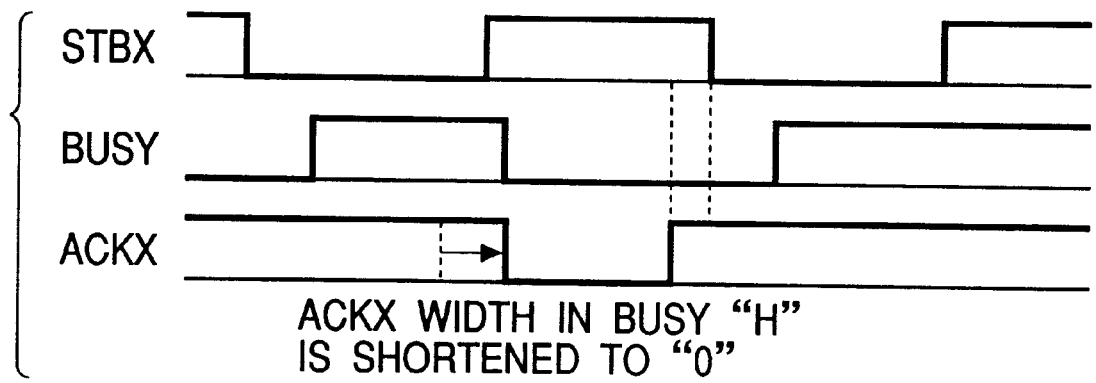
FIGS. 10A and 10B are timing charts of STBX, BUSY, and ACKX signals of the ink jet printer according to the first embodiment of the invention.
Figure 10B:
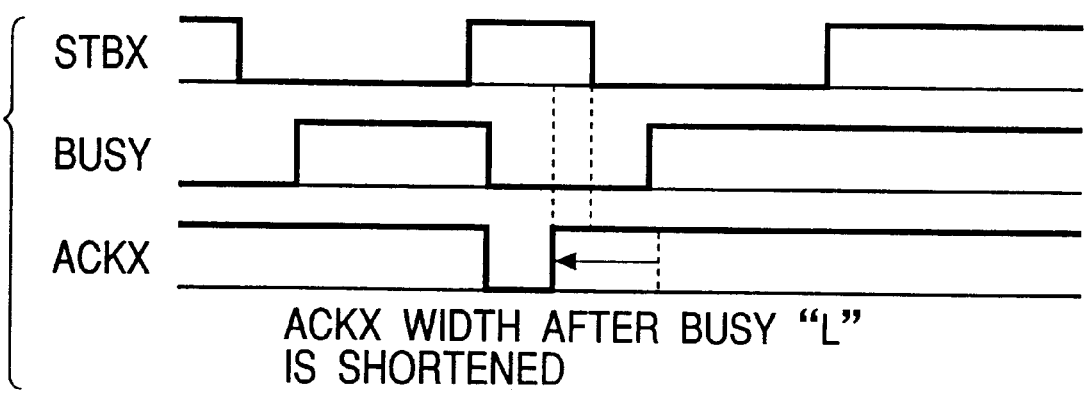

Next, the ACKX "L" time after the period of BUSY "L" is gradually shortened (refer to FIG. 10B, Steps S16 to S19). If data can be received even after ACKX is lost, then ACKX is not output thereafter, whereas if data becomes unable to be received at an intermediate cycle, the timings of ACKX and BUSY are set under the conditions one cycle before to resume data reception.

By controlling the ACKX width by the above processes, the ink jet printer can perform an optimum STBX-BUSY-ACKX control relative to the host apparatus.

According to the first embodiment described above, the ink jet printer is provided with the interface control block 22 and CPU 21, the former transmitting the ACKX signal representative of a completion of data reception from the host apparatus 100 to the host apparatus 100, and the latter controlling not to output the ACKX signal if it is judged from a plurality of data receptions from the host apparatus 100 that the ACKX signal is unnecessary, and to output the ACKX signal with an optimum width if it is judged that the ACKX signal is necessary. Accordingly, high speed data reception suitable for each host apparatus connected to the ink jet printer becomes possible and the throughput can be improved.

Second Embodiment

Similar to the first embodiment, the main part or control system of an ink jet printer according to the second embodiment is constituted of a CPU 21, an interface (I/F) control block 22, a ROM 24, and a reception buffer 25A of a working memory 25 (refer to FIG. 1).

Similar to the first embodiment, the ink jet printer of the second embodiment has, in its main frame, transport rollers 2 and 3, a guide shaft 5, a carriage 6, a belt 8, a sheet feed motor 70, a carriage motor 71, a print head unit 90, an ink cartridge 92, an operation panel 160, and the like (refer to FIG. 2).

Similar to the first embodiment, the control system and the structure of each mechanical unit of the ink jet printer of the second embodiment, are constituted of CPU 21, data memory 23, program memory 24, working memory 25, power supply circuit 28, print head control circuit 29, black print head 9A, cyan print head 9B, magenta print head 9C, yellow print head 9D, I/F control block 22, operation keys 60A to 60D, input port 32, output port 26, carriage motor control circuit 42, carriage motor 71, sheet feed motor control circuit 44, sheet feed motor 70, transport mechanism 43, output port 36, alarm LED 61A, power LED 61B, and LCD 65 (refer to FIG. 3).

The structure and operation of each component of the ink jet printer of the second embodiment have already been described in detail in the first embodiment, and so the description is omitted.

In the first embodiment, in order to determine an optimum ACKX control, the ink jet printer tries to receive print data from the host apparatus a plurality of times. In the second embodiment, a command is prepared for transmitting ACKX width information from the ink jet printer to the host apparatus. By utilizing this command, the effects similar to the first embodiment can be obtained.

According to the second embodiment described above, the ink jet printer is provided with the interface control block 22 and CPU 21, the former transmitting the ACKX signal representative of a completion of data reception from the host apparatus 100 to the host apparatus 100, and the latter controlling to output the ACKX signal by utilizing the command for transmitting the ACKX width information from the ink jet printer to the host apparatus. Accordingly, high speed data reception suitable for each host apparatus connected to the ink jet printer becomes possible and the throughput can be improved.

In the first and second embodiments, an ink jet printer has been used by way of example as a recording apparatus. The embodiments are not limited only to an ink jet printer, but it is obvious that other types of recording apparatuses can also be used.

As described above, according to the first embodiment, a recording apparatus capable of receiving data from a higher hierarchical apparatus has communications means for transmitting a signal representative of a completion of data reception from the higher hierarchical apparatus to the higher hierarchical apparatus and control means for controlling an output of the completion signal in accordance with the performance of the upper hierarchical apparatus. Accordingly, high speed data reception suitable for each higher hierarchical apparatus becomes possible and the throughput can be improved.

The control means of the recording apparatus of the first embodiment controls not to output the completion signal if it is judged that the completion signal is not necessary, so as not to output the completion signal to a higher hierarchical apparatus which does not require the completion signal. Accordingly, it is possible to shorten the time required for receiving the next data from the higher hierarchical apparatus, to perform high speed data reception suitable for each higher hierarchical apparatus, and to improve the throughput.

The control means of the recording apparatus of the first embodiment controls to output the completion signal with an optimum width if it is judged that the completion signal is necessary, so as not to output the completion signal with an improper width to a higher hierarchical apparatus. Accordingly, it is possible to shorten the time required for receiving the next data from the higher hierarchical apparatus, to perform high speed data reception suitable for each higher hierarchical apparatus, and to improve the throughput.

The control means of the recording apparatus of the first embodiment controls to output the completion signal in accordance with a plurality of data receptions from a higher hierarchical apparatus via the communications means. By controlling the output of the completion signal, high speed data reception suitable for each higher hierarchical apparatus becomes possible and the throughput can be improved.

The control means of the recording apparatus of the second embodiments controls to output the completion signal by utilizing the command signal for transmitting width information of the completion signal. By controlling the output of the completion signal, high speed data reception suitable for each higher hierarchical apparatus becomes possible and the throughput can be improved.

Controlling the completion signal of the first and second embodiments is applicable to the recording apparatus of the type that a recording head unit having a plurality of recording elements disposed in a direction perpendicular to a scan direction and that the recording head unit is scanned to record data on a recording medium while the medium is moved by a predetermined amount at each scan. By controlling the output of the completion signal, high speed data reception suitable for each higher hierarchical apparatus becomes possible and the throughput can be improved.

Third Embodiment

Figure 11:
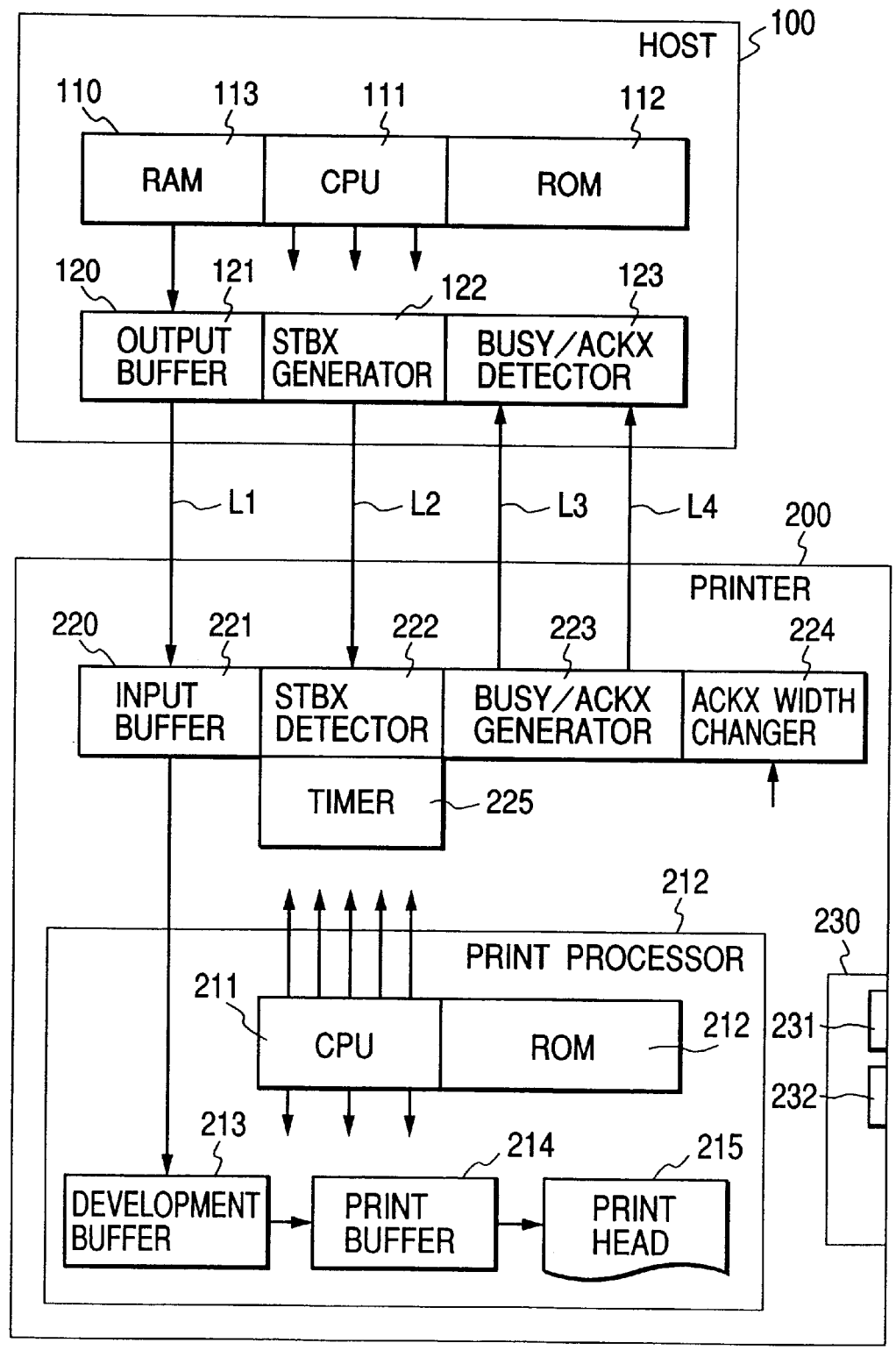
FIG. 11 is a block diagram showing the outline structure of a data processing system using a printer according to a third embodiment of the invention.

FIG. 11 is a block diagram showing the outline structure of a data processing system using a printer according to the third embodiment of the invention. This data processing system has a host computer 100 and a printer 200.

The host computer 100 is constituted of a data processing unit 110 and an interface unit 120. The data processing unit 110 has a CPU 111, a ROM 112, and a RAM 113. The interface unit 120 has an output buffer 121, an STBX generator 122, and a BUSY/ACKX detector 123. CPU 111 of the data processing unit 110 performs various data processing in accordance with a system program stored in ROM 112 and application programs and the like stored in an unrepresented hard disk.

The interface unit 120 conforms with the Centronics interface. The output buffer 121 of the interface unit 120 is used for temporarily storing print data processed by CPU 111 when a print command is issued or in other cases. The STBX generator 122 generates an STBX signal which is a kind of a signal used for data transfer to and from the printer 200 through handshaking. The STBX signal indicates that data is output to a data line L1, i.e., indicates a data validity. This STBX signal is output to the printer 200 via the STBX control line L2. The BUSY/ACKX detector 123 detects a BUSY signal (representative of an active state of data reception) or an ACKX signal (representative of a completion of data reception) returned back from the printer 200 via a BUSY control line L3 or an ACKX control line L4.

The printer 200 has a print processor 210, an interface unit 220, and an operation panel 230. The print processor 210 has a CPU 211, a ROM 212, a development buffer 213, a print buffer 214, and a print head 215. The interface unit 220 has an input buffer 221, an STBX detector 222, a BUSY/ACKX generator 223, an ACKX width changer 224, and a timer 225. The operation panel 230 is made of, for example, a liquid crystal touch panel, and has various setting keys (not shown) such as a paper size setting key, an ACKX width setting key 231 for manually setting an ACKX signal width, and an ACKX width setting mode key 232 for setting an ACKX width setting mode which automatically sets an optimum ACKX signal width.

Figure 14:
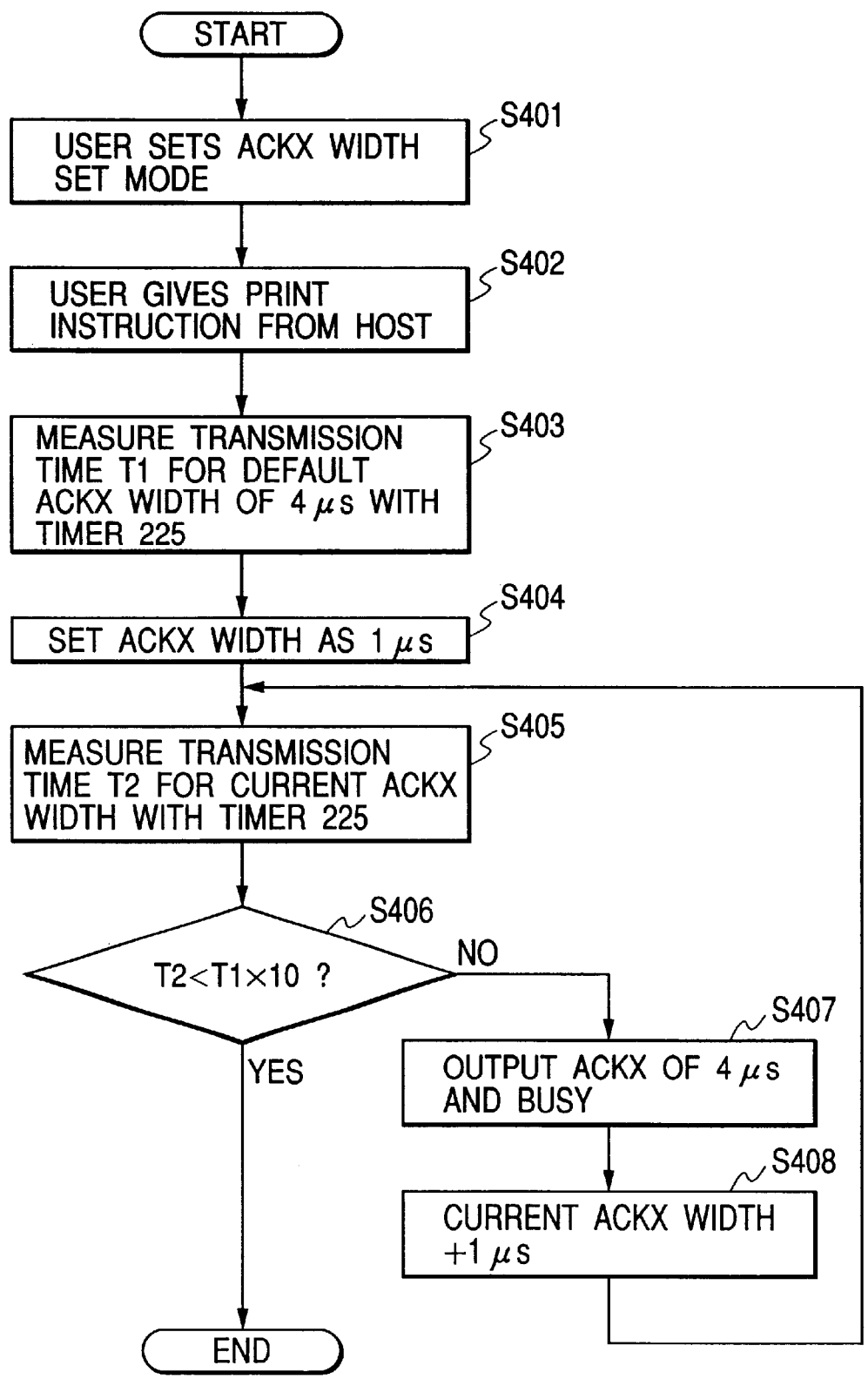
FIG. 14 is a flow chart illustrating a data transmission control specific to a fifth embodiment.

CPU 211 of the print processor 210 controls various print processes in accordance with a program stored in ROM 212 which also stores a program corresponding to the flow chart shown in FIG. 14. The development buffer 213 stores received compression data temporarily stored in the input buffer 221, after the compression data is developed or subjected to other processes. The data developed in the development buffer 213 is subjected predetermined image processing, temporarily stored in the print buffer 214, and thereafter printed with the print head 215.

The input buffer 221 of the interface unit 220 temporarily stores print data (including print control commands) transmitted from RAM 113 of the host computer 100 via the output buffer 121 and data line L1. The STBX detector 222 detects an STBX signal transmitted from the STBX generator 122 of the host computer 100 via an STBX control line L2. The BUSY/ACKX width changer 224 changes an ACKX signal width in accordance with an operation by the ACKX width setting key 231. The timer 225 counts a timing of data transmission from the host computer 100 to the printer 200 in accordance with the STBX signal.

The timer 225 and ACKX width setting mode key 232 are constituent elements specific to a fifth embodiment to be described later, and are not necessarily required to be used by the third and fourth embodiments. The ACKX width setting key 231 is a constituent element specific to the third and fourth embodiments, and is not necessarily required to be used by the fifth embodiment.

Next, a handshaking control will be described. As the STBX signal is transmitted from the STBX generator 122 synchronously with print data transmission from the output buffer 121 of the host computer 100, the printer 200 detects this STBX signal and fetches the print data synchronously with the STBX signal. During the reception of the print data and after the print data reception, the BUSY signal and ACKX signal are returned from the BUSY/ACKX generator 223. Upon detection of the BUSY and ACKX signals by the BUSY/ACKX signal detector 123, the host computer 100 transmits the next data if any. In this case, the ACKX width changer 224 changes the ACKX signal width.

Figure 12:
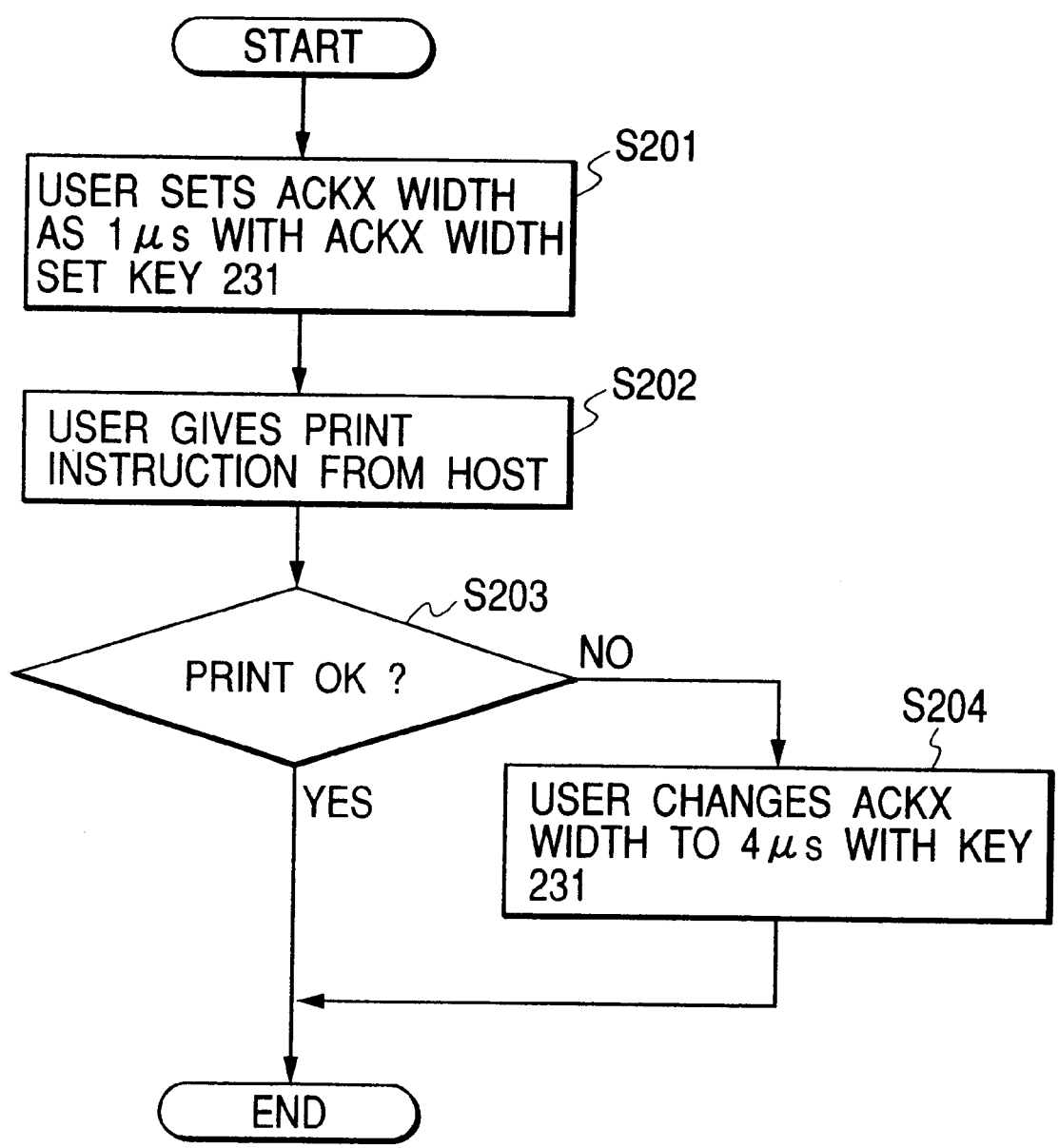
FIG. 12 is a flow chart illustrating a data transmission control specific to the third embodiment.

Next, the data transmission control specific to the third embodiment will be described with reference to the flow chart show in FIG. 12.

Figure 15:
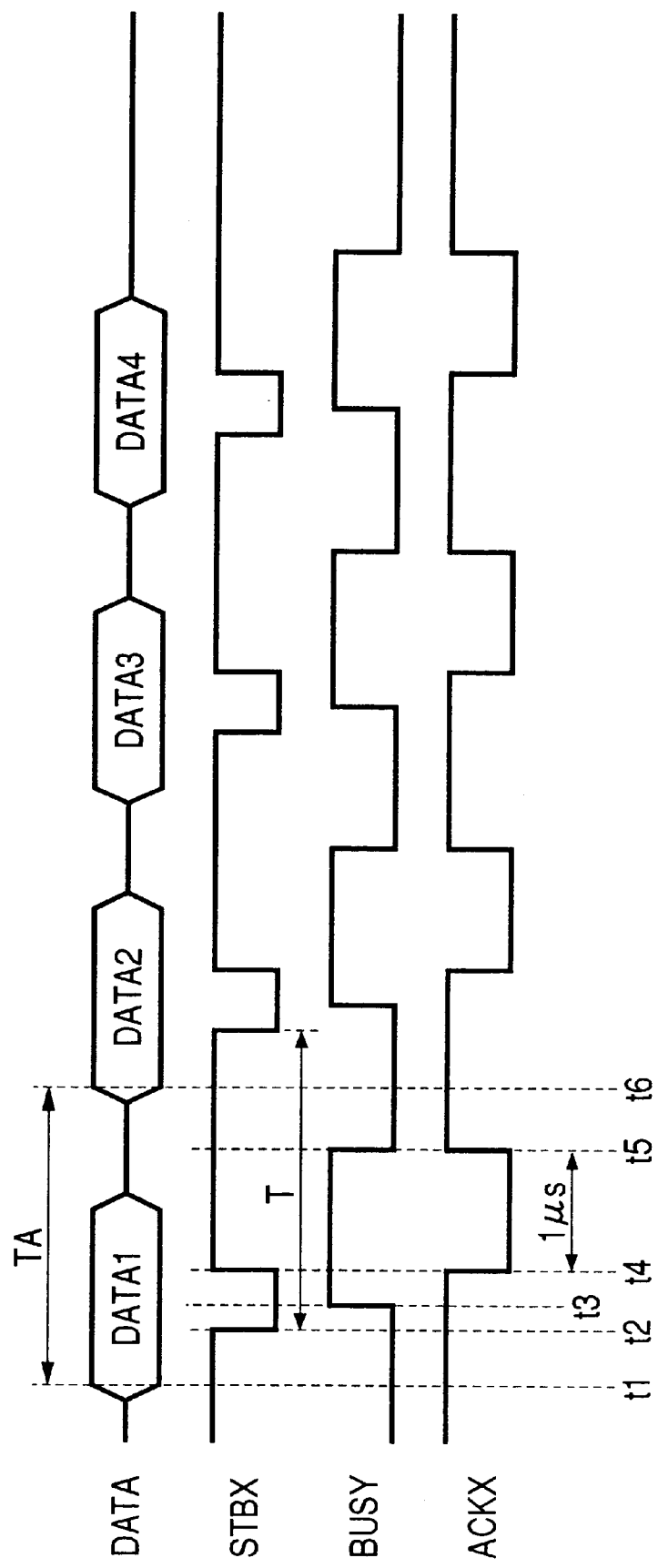
FIG. 15 is a timing chart illustrating an ideal case of the invention.

A user sets the ACKX signal width to 1 μsec by operating upon the ACKX setting key 231 of the printer 200 (Step S201). Next, the user gives a print instruction from an application program of the host computer 100 to make the printer 200 print data (Step S202). It is checked whether the print state, i.e., the print state when the ACKX signal having a width of 1 μsec is used, is good (Step S203). If good, the setting of the ACKX signal width of 1 μsec is remained unchanged and the process is terminated. In this case, the print operation continues at the ACKX signal with of 1 μsec and at a considerably high data transmission speed (refer to TA in FIG. 15). It is therefore possible to print at high speed while a good print state is maintained.

If the print state is not good, the user sets the ACKX signal width to 4 μsec this time by operating upon the ACKX setting key 231 (Step S204) and the process is terminated. The following data transmission is performed by using the ACKX signal having a large signal width of 4 μsec so that the print state defect can be eliminated.

Figure 17:
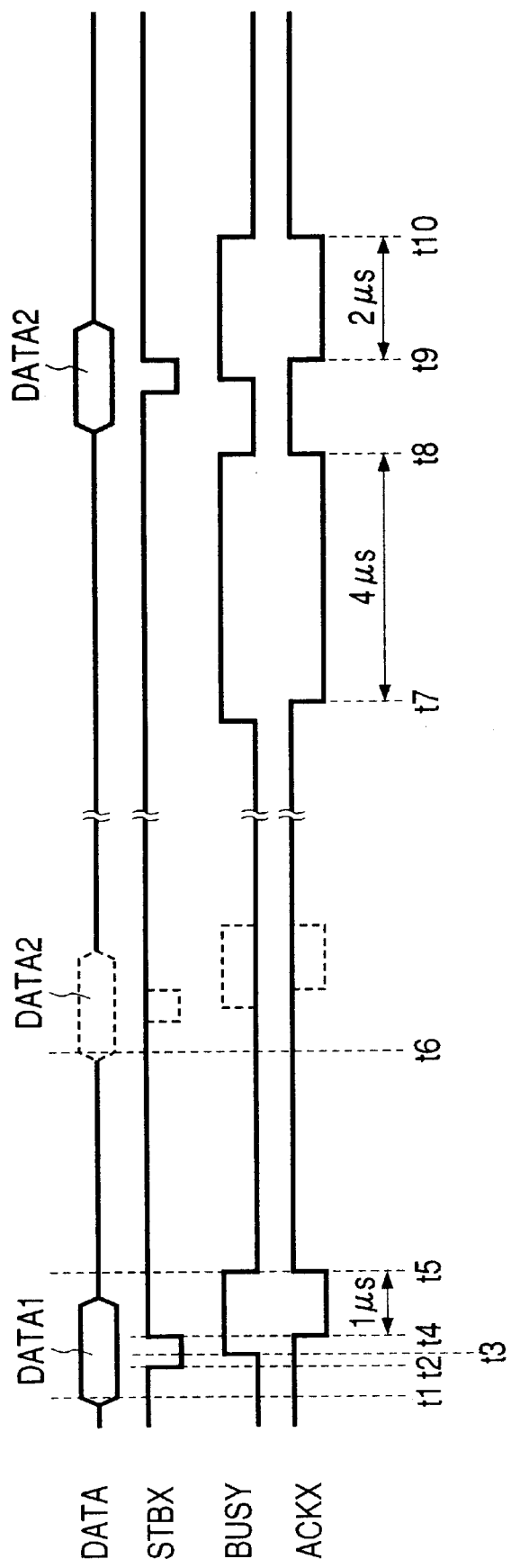
FIG. 17 is a timing chart illustrating the case wherein a host computer cannot recognize an ACKX signal.
Figure 18:
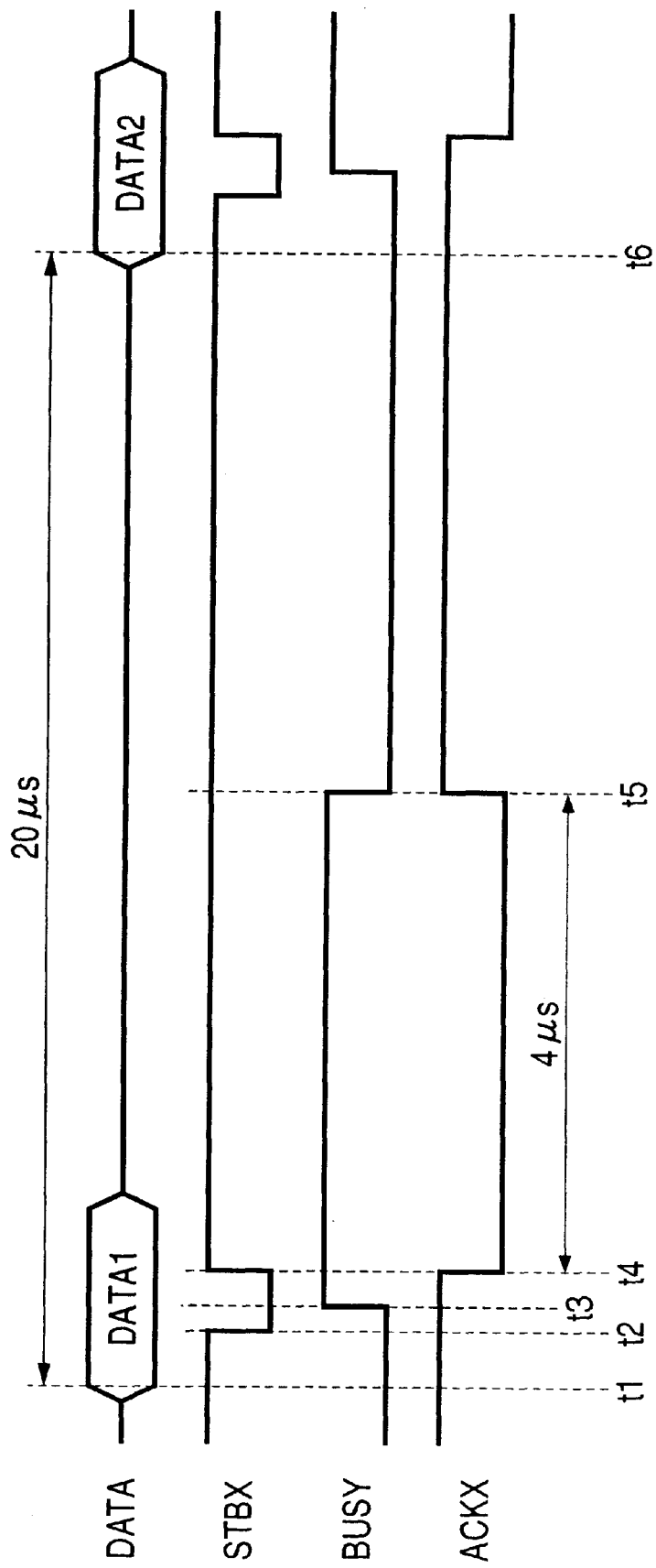
FIG. 18 is a timing chart illustrating a conventional data transmission control.

The print state defect results from an inability of transmitting the next data because the ACKX signal width sent from the printer 200 is short and the BUSY/ACKX detector 123 of the host computer 100 cannot detect the ACKX signal (refer to DATA 2 indicated by a broken line in FIG. 17). More specifically, if the ACKX signal cannot be detected, the host computer 100 remains waiting for the ACKX signal and thereafter intercepts the data transmission upon a timeout. Therefore, the next data is not transmitted even how long it is waited for, and the print stop state continues. In this embodiment, however, a long ACKX width of 4 μsec is set when the print state defect occurs so that the next data can be performed correctly.

Figure 16:
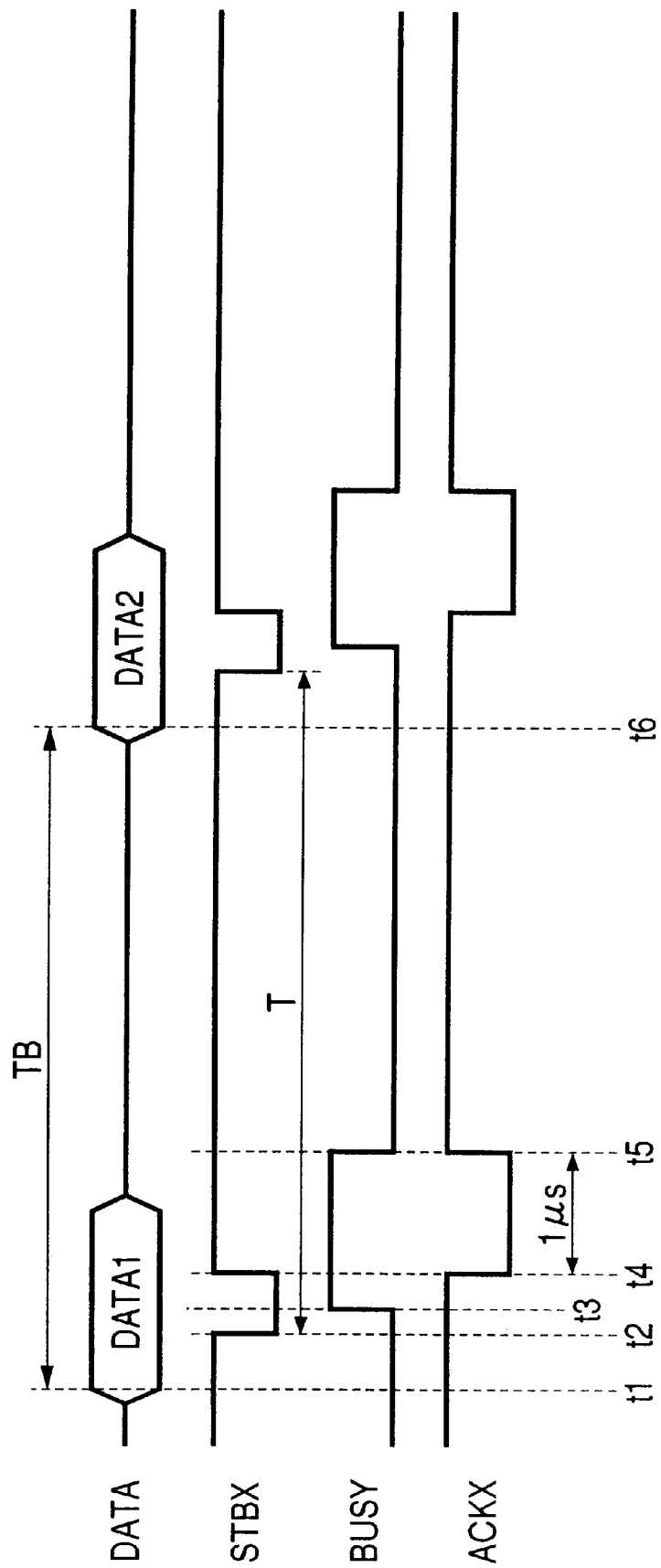
FIG. 16 is a timing chart illustrating the case wherein the invention is applied to a host computer having a low performance.

The print process time may not be shortened even if the print state is normal. One reason of this is a low data transmission speed caused by a low ability of the host computer (refer to TB in FIG. 16). In this case, even if the ACKX signal width is shortened, it does not contribute to the improvement on the data transmission speed. The other reason is a print speed of the printer 200 slower than the data transmission speed of the host computer.

In this embodiment, even if the print speed is not shortened even if the print state is normal, the ACKX signal width of 1 μsec is remained unchanged. However, the ACKX signal width may be set to 4 μsec to allow a large margin of detecting the ACKX signal by the host computer 100, if the measured print time at the ACKX signal width of 1 μsec is not shortened more than the measured print time at the ACKX signal width of 4 μsec, which means that the processing ability of the host computer 100 is low.

If the data amount is small because of a large data compression factor, it may be happen that the print time does not change because of a print speed limit of the printer 200. In this case, the above-described print time measurement may be performed by printing data having a small data compression factor such as a picture of a nature scene in a low speed print mode such as a draft mode.

Fourth Embodiment

Figure 13:
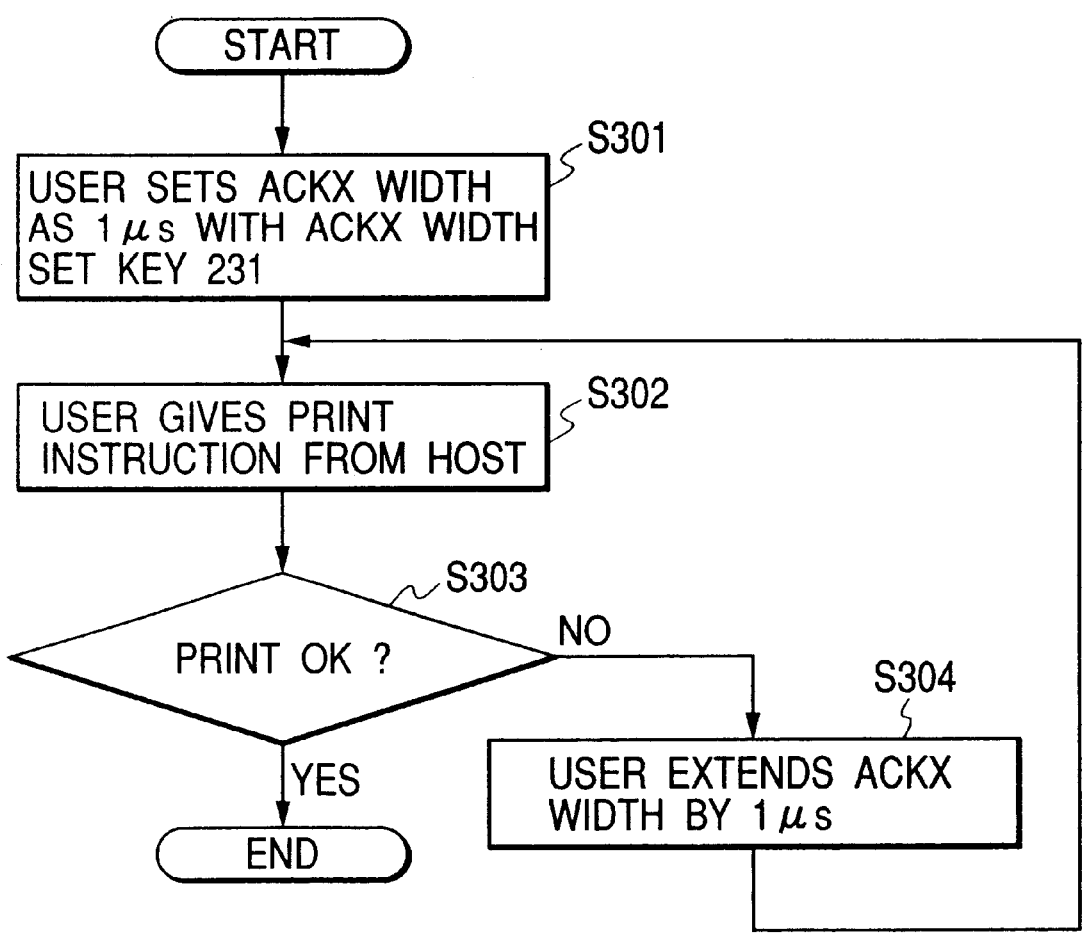
FIG. 13 is a flow chart illustrating a data transmission control specific to a fourth embodiment.

Next, the data transmission control specific to the fourth embodiment will be described with reference to the flow chart shown in FIG. 13.

A user sets the ACKX signal width to 1 μsec by operating upon the ACKX setting key 231 of the printer 200 (Step S301). Next, the user gives a print instruction from an application program of the host computer 100 to make the printer 200 print data (Step S302). It is checked whether the print state, i.e., the print state when the ACKX signal having a width of 1 μsec is used, is good (Step S303). If good, the setting of the ACKX signal width of 1 μsec is remained unchanged and the process is terminated. In this case, the print operation continues at the ACKX signal with of 1 μsec and at a considerably high data transmission speed (refer to TA in FIG. 15). It is therefore possible to print at high speed while a good print state is maintained.

If the print state is not good, the user sets the ACKX signal width to 2 μsec by operating upon the ACKX setting key 231 (Step S304) and the process is terminated. The following data transmission is performed by using the ACKX signal having a large signal width of 2 μsec. It is checked whether the print state at the ACKX signal width of 2 μsec is good (Step S303). If good, the process is terminated, whereas if not good, the user sets the ACKX signal width to 3 μsec by operating upon the ACKX setting key 231 (Step S304).

In the above manner, the ACKX signal width is elongated by a step of 1 μsec until the good print state is obtained. In other words, an optimum ACKX signal width is determined in accordance with the performances of the host computer 100 and printer 200 to improve the data transmission speed from the host computer 100 to printer 200 as much as possible to thereby improve the print speed.

Also in the fourth embodiment, if the print time is not shortened even if the print state is normal, then the similar countermeasures to the third embodiment may be used.

Fifth Embodiment

Next, the data transmission control specific to the fifth embodiment will be described with reference to the flow chart shown in FIG. 14.

A user sets the ACKX width setting mode by operating upon the ACKX width setting mode key 232 of the printer 200 (Step S401). Next, the user gives a print instruction from an application program of the host computer 100 to make the printer 200 print data (Step S402). In this initial state, the ACKX width changer 224 is preset to an ACKX signal width of 4 μsec.

As the print operation starts, CPU 211 of the printer 200 makes the timer 225 count a time T1 required for data transmission from the host computer 100 to the printer 200, in accordance with the program stored in ROM 212 (Step S403). By measuring the data time T1 required for data transmission at Step S403, the data transmission time at the ACKX signal width of 4 μsec can be measured indirectly.

Next, CPU 211 makes the ACKX width changer 224 set the ACKX signal width to 1 μsec (Step S404). In this setting process, the ACKX width changer 224 controls the BUSY/ACKX generator 223 generate an ACKX signal having a width of 1 μsec. The timer 225 counts a time T2 required for data transmission at the ACKX signal width of 1 μsec (Step S405).

The timer 225 counts the times T1 and T2 required for data transmission, i.e., data transmission times, by measuring the period T (refer to FIGS. 5 and 6) of the STBX signal supplied from the host computer 100. As above, in the fifth embodiment, the data transmission time is measured in accordance with the period T of the STBX signal supplied from the host computer 100, without being affected by the print speed of the printer 200.

Next, CPU 211 judges whether the data transmission time T2 at the ACKX signal width of 1 μsec is shorter than a tenfold time (T1×10) of the data transmission time T1 at the ACKX signal width of 4 μsec (Step S406), If T2<T1 , it means that the data transmission time is improved at the ACKX signal width of 1 μsec. If T2=T1, it means that the data transmission time does not change because of a low processing performance of the host computer 100. If T2≧T1×10, it means that the next data cannot be transmitted because the ACKX signal width of the printer 200 is short as shown in DATA 2 indicated by a broken line in FIG. 17 and the host computer 100 cannot recognize the ACKX signal and maintains waiting for it.

In this embodiment, if the host computer 100 can recognize the ACKX signal, i.e., if it is judged at Step S406 as T2<T1×10, then the ACKX signal width setting mode is terminated and the ACKX signal width of 1 μsec is used in the succeeding data transmission. If it is judged at Step S406 as T2≧T1×10 which means the host computer 100 cannot recognize the ACKX signal and cannot transmit the next data, then CPU 211 makes the ACKX signal and BUSY signal having a width of 4 μsec be output at timings t1 to t8, so that the host computer 100 can reliably recognize the ACKX signal and transmit the next data (Step S407).

The time-out of the handshaking operation of the host computer 100 is generally about several seconds. In this embodiment, a delay of the ACKX signal is at a maximum a total of the width (4 μsec×10+4 μsec) of the ACKX signals and the data fetch time (generally about 200 nsec). This total is shorter than the time-out so that the time-out control is not actually executed.

After the ACKX signal and BUSY signal having the width of 4 μsec are output at Step S407, CPU 211 makes the ACKX width changer 224 set an ACKX signal width of 2 μsec longer than the previous width by 1 μsec (Step S408: refer to t9 to t10 in FIG. 17), to thereafter return to Step S405 whereat the time T2 required for data transmission from the host computer 100 is measured. Then at Step S406, the data transmission time T2 at the ACKX signal width of 2 μsec is compared with a tenfold time (T1×10) of the data transmission time T1 at the ACKX signal width of 4 μsec. The above operations are repeated until it becomes that the host computer 100 can recognize the ACKX signal and transmit the next data to automatically determine an optimum ACKX signal width.

As above, in the fifth embodiment, the ACKX signal width changer 224 automatically sets a desired ACKX signal width during data reception, the time required for data transmission at the set ACKX signal width is measured by the timer 225, and in accordance with the measured result of the time required for data transmission, an optimum ACKX signal width is automatically determined. Accordingly, a user can set an optimum signal width simply by operating upon the ACKX signal width setting mode key 232, so that the data transmission speed can be raised and the high speed print can be realized.

The invention is not limited only to the above embodiments, but various modifications and changed are possible. For example, the ACKX signal width may be made longer not only at a step of 1 μsec, but also at other steps of 0.5 μsec and the like in the fourth and fifth embodiments.

An additional margin of about 0.5 μsec may be added to the measured ACKX signal width by taking into account a variation to be caused by a temperature change or the like.

As described above, according to the embodiment, a printer having an interface unit for receiving data transmitted from a host computer through handshaking, has an ACKX width changer means for changing an ACKX signal width and a setting means for setting an ACKX signal width to the ACKX signal width changer means. It is therefore possible to improve the data transmission speed from the host computer to the printer as much as possible in accordance with the performances of the host computer and printer, and to realize a high speed print.

The present invention may be applied to a system constituted by a plurality of apparatuses or to a system constituted by a single apparatus. Obviously, the scope of the invention includes a system or apparatus whose computer (CPU or MPU) reads and executes program codes stored in a recording medium supplied to the system or apparatus, the program codes realizing the functions of the embodiments.

In this case, the program codes themselves read from the recording medium realize the embodiment functions. Therefore, the recording medium storing the program codes constitute the present invention.

The storage medium storing such program codes may be a floppy disk, a hard disk, an optical disk, a photomagnetic disk, a CD-ROM, a CD-R, a magnetic tape, a non-volatile memory card, and a ROM.

Obviously, such program codes are other types of embodiments of this invention, not only for the case wherein the embodiment functions are realized by executing the program codes supplied to the computer but also for the case wherein in accordance with the program codes, an OS on which the computer runs executes part or the whole of the actual tasks for realizing the embodiment functions.

Furthermore, the scope of the invention also includes obviously the case wherein in accordance with the program codes stored in a memory of a function expansion board or unit connected to the computer supplied with the program codes, a CPU or the like of the function board or unit executes part or the whole of the actual tasks for realizing the embodiment functions.

What is claimed is:

1. A printer comprising:

a transmission unit that transmits a response signal to a higher hierarchical apparatus during a first time when data is received from the higher hierarchical apparatus; and a determination unit that determines the first time as the response time if next data is successfully received, and if the next data is not successfully received, determines a second time longer than the first time as the response time.

2. A printer comprising:

a first determination unit that transmits a response signal to a higher hierarchical apparatus during a first time when data is received from the higher hierarchical apparatus, and determines a second time shorter than the first time as a response time if the next data is successfully received; and a second determination unit that transmits the response signal to the higher hierarchical apparatus during the second time when data is received from the higher hierarchical apparatus, and determines the first time as the response time if the next data is not successfully received.

3. A control method for a printer comprising the steps of:

transmitting a response signal to a higher hierarchical apparatus during a first time when data is received from the higher hierarchical apparatus; and determining the first time as the response time if next data is successfully received, and if the next data is not successfully received, determining a second time longer than the first time as the response time.

4. A control method for a printer comprising the steps of:

a first determination step that transmits a response signal to a higher hierarchical apparatus during a first time when data is received from the higher hierarchical apparatus, and determines a second time shorter than the first time as the response time if the next data is successfully received; and a second determination step that transmits the response signal to the higher hierarchical apparatus during the second time when data is received from the higher hierarchical apparatus, and determines the first time as the response time if the next data is not successfully received.

5. A storing medium storing a control program for a printer, the control program comprising the steps of:

a transmission step that transmits a response signal to a higher hierarchical apparatus during a first time when data is received from the higher hierarchical apparatus: and a determination step that determines the first time as the response time if next data is successfully received, and if the next data is not successfully received, determines a second time longer than the first time as the response time.

6. A storing medium storing a control program for a printer, the program comprising the steps of:

a first determination step that transmits a response signal to a higher hierarchical apparatus during a first time when data is received from the higher hierarchical apparatus, and determines a second time shorter than the first time as the response time if the next data is successfully received; and a second determination step that transmits the response signal to the higher hierarchical apparatus during the second time when data is received from the higher hierarchical apparatus, and determines the first time as the response time if the next data is not successfully received.

* * * * *